United States Patent [19]

Cvijanovich

[11] 4,221,210

[45] Sep. 9, 1980

[54] SYSTEM AND METHOD FOR COLLECTING ENERGY FROM THE SUN

[75] Inventor: George B. Cvijanovich, Glen Rock, N.J.

[73] Assignee: Heliotherme, Inc., Bloomfield, N.J.

[21] Appl. No.: 820,903

[22] Filed: Aug. 1, 1977

[51] Int. Cl.³ .................................................. F24J 3/02
[52] U.S. Cl. .................................... 126/445; 126/432; 126/900; 126/452; 252/71
[58] Field of Search ............... 126/270, 271, 444, 445, 126/452, 900, 437, 432, 435; 237/1 A; 165/104 M; 252/71; 350/1.5, 179, 267, 312

[56] References Cited

U.S. PATENT DOCUMENTS

| | | | |
|---|---|---|---|
| 2,515,672 | 7/1950 | Sowa | 165/104 M |
| 3,161,193 | 12/1964 | Rowekamp | 126/271 |
| 3,981,294 | 9/1976 | Deminet et al. | 126/271 |
| 4,038,967 | 8/1977 | Stout et al. | 126/271 |
| 4,047,518 | 9/1977 | Anderson | 126/271 |
| 4,055,163 | 10/1977 | Costello et al. | 126/271 |
| 4,060,072 | 11/1977 | Johnson | 126/271 |
| 4,062,352 | 12/1977 | Lesk | 126/271 |
| 4,083,490 | 4/1978 | Cunningham et al. | 126/271 |
| 4,114,597 | 9/1978 | Erb | 126/270 |
| 4,116,222 | 9/1978 | Seifried | 126/271 |

*Primary Examiner*—James C. Yeung
*Assistant Examiner*—Larry Jones
*Attorney, Agent, or Firm*—Levonna Herzog

[57] ABSTRACT

The system for collecting energy from the sun is composed of a transparent panel having a plurality of channels open at both ends, a liquid capable of absorbing about 85-100% of the energy from impinging rays of the sun per centimeter thickness of the liquid, means for introducing the liquid into the panel and means for removing the liquid from the panel. Energy from the sun is collected by circulating the liquid capable of absorbing 85-100% of energy from impinging rays of the sun in a transparent panel which is exposed to the sun per centimeter thickness of the liquid. Heat absorbed by the circulating liquid may be transferred through the medium of heat exchanger and used to heat a building, for hot water and the like.

15 Claims, 3 Drawing Figures

SYSTEM AND METHOD FOR COLLECTING ENERGY FROM THE SUN

BACKGROUND OF THE INVENTION

This invention concerns a system and a process for collecting energy from the sun. More particularly, this invention concerns a system and method, which includes an energy collecting device, whereby a high proportion of energy from the sun, reaching most inhabited places on earth may be collected in a form readily available for use, as heat. This invention also involves a system and a method for collecting and using energy from the sun, which includes an energy collecting device which may be used as a structural member of a building.

Devices for collecting energy from the sun, wherein water is circulated through a heat absorbing metal panel which is exposed to the sun are well known. Such devices are often placed on roof tops in tropical climates and water, thus heated by the sun is then used for household purposes, such as heating, washing and the like. However, such energy collectors are very expensive and are not economically practical in temperate and colder climates. In addition, such energy collectors are heavy and require expensive reinforcement of the roof structure and accordingly, the installation is complicated and costly.

SUMMARY OF THE INVENTION

A principal object of the present invention is the provision of a system and method for collecting energy from the sun, whereby the highest possible proportion of energy which reaches the surface of the energy collecting device is retained therein and converted to a needed form of energy.

Another important object of the present invention is the provision of a system and method for collecting energy from the sun, whereby the collector itself does not absorb a substantial amount of energy from the sun, and wherein a circulating liquid is provided which does absorb substantially all of the energy from the sun which reaches the collector.

Another object of the present invention is the provision of a system and method for collecting energy from the sun, which may be used effectively and economically in most inhabited places.

Still another important object of the present invention is the provision of a system and method for collecting energy from the sun wherein an ecomomical and simple energy collecting device is used.

A further object of the present invention is the provision of a system and method for collecting energy from the sun involving the use of an energy collecting device which may be also used as an outside structural member of a building, such as the waterproofing surface of a roof.

It is also an object of the present invention to provide an energy collecting device which may be installed easily and economically and with a minimum of skill and which is used in the system and method of the invention.

A still further object of the present invention is the provision of a liquid composition which is capable of directly absorbing a high proportion of the energy from impinging rays of the sun and, which in turn is capable of transferring a high proportion of such energy to a heat exchanger so that it is available for use when needed.

These and other objects will in part be obvious and will in part appear hereinafter.

With the above and other objects in view, the invention includes a system for collecting energy from the sun which comprises a transparent panel composed of a plurality of channels open at both ends, a liquid in the channels containing a dispersion of dark pigment or a solution of dark colorant, the liquid being capable of absorbing about 85-100% of energy from impinging rays of the sun, per centimeter thickness of the liquid, means for continuously introducing the liquid into one end of the channels and means for continuously removing the liquid from the other end of the channels.

Another embodiment of the invention involves a process for collecting and using energy from the sun, wherein water is circulated in a transparent panel which is exposed to the sun and the water which has been thus heated by exposure to the sun is used as an energy source, which comprises circulating a liquid which is capable of absorbing about 85-100% of energy from impinging rays of the sun, per centimeter thickness of the liquid, the liquid being selected from an aqueous dispersion of dark pigment in deionized water and an aqueous solution of dark colorant.

Another embodiment of the invention is a composition useful for collecting energy from the sun which consists essentially of a dispersion of carbon particles of about 1 m$\mu$ to about 0.1 mm. in size in deionized water and up to about 80 % by weight, based on the weight of water of a nonionic antifreeze composition, the dispersion containing carbon particles in an amount such that the dispersion is capable of absorbing about 85-100% of energy from impinging rays of the sun, per centimeter thickness of the liquid.

DESCRIPTION OF THE INVENTION

According to the invention, a liquid which absorbs from about 85% to about 100% and most preferably about 95% to about 100% of energy from impinging rays of the sun, per centimeter thickness of the fluid is used as an energy collecting medium. The liquid is composed of a dispersion of dark pigment in deionized water or an aqueous solution of dark radiant energy-absorbing colorant. It is important that the pigment particles be dispersed in deionized water, otherwise, the particles which may be about 1m$\mu$ to about 0.1 mm. in size tend to settle out. The dispersion of pigment particles may be in the form of a colloidal dispersion or a suspension. The preferred pigment is carbon. As the colorant, any water soluble material which provides the desired energy-absorbing characteristics when an aqueous solution thereof is exposed to the sun may be used including for example, inorganic compounds, such as potassium permanganate, organic materials including complexes and dyes such as 4,4'-diaminodiphenylamine and diphenyl black base.

The energy-absorbing liquid may also contain a conventional antifreeze composition, so that the liquid does not freeze under the lowest temperature conditions prevalent in the area where the solar energy collecting system is to be used. Conventional nonionic antifreeze compositions such as alcohols, i.e. methanol, ethanol and isopropanol and glycols, such as ethylene glycol and propylene glycol are used with liquid dispersions of carbon particles. Both nonionic and ionic anti-freeze compositions, i.e. salts may be used with solutions of black dye, providing only that the antifreeze composition does not adversely affect the light absorbing characteristics of the dye solution. The amount of antifreeze composition used depends on the climate; thus, the liquid dispersion of carbon particles may contain up to about 80% by weight of a liquid antifreeze composition, based on the weight of the liquid and a dye solution can be similarly loaded with a liquid antifreeze composition and to saturation with a salt antifreeze composition.

Figure 1:
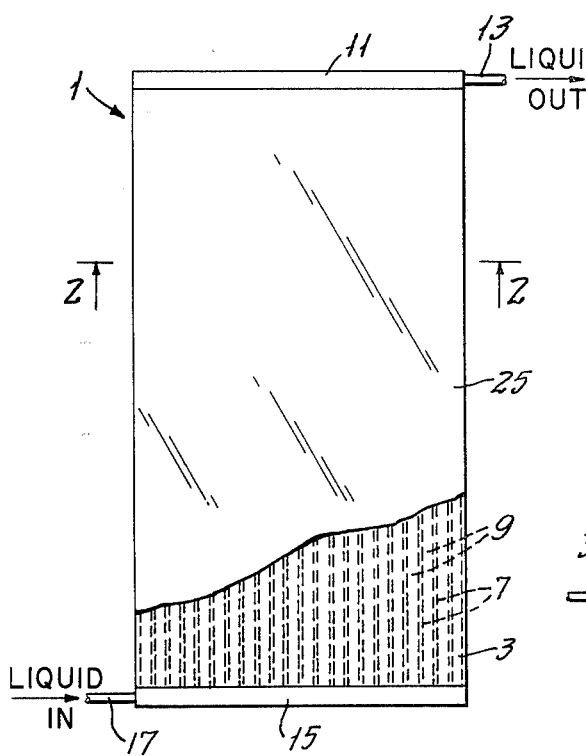
FIG. 1 is a plan view of one embodiment of a transparent panel of the invention which is used in the present system and method of collecting energy from the sun and FIG. 2 is a cross section of the panel illustrated in FIG. 1, taken along the line 2—2.
Figure 2:
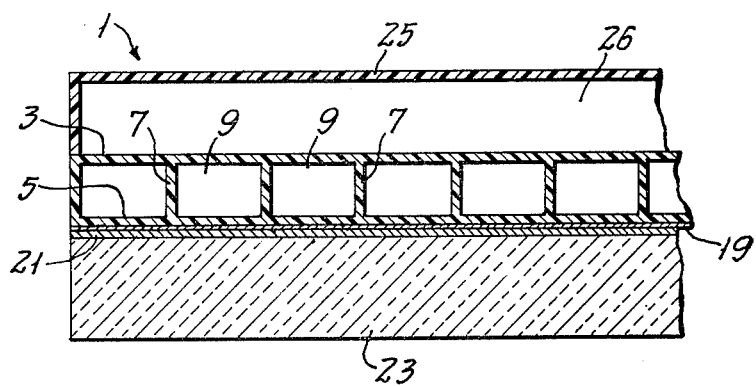

In accordance with the invention, the energy-absorbing liquid flows through a transparent panel having a honeycomb construction, which is best described by reference to the drawings, which illustrate a preferred embodiment thereof. In FIGS. 1 and 2, the panel 1 is provided with a front pane 3 and rear pane 5 which are joined together by longitudinal side walls 7. The longitudinal side walls form channels 9. Channels 9 open at one end to conduit 11 which is provided with outlet 13 and at the other end to conduit 15 which is provided with inlet 17.

In the preferred embodiment of the invention illustrated in FIGS. 1 and 2, the outside surface of rear pane 5 is provided with a black coating 19, such as a coating of dull black paint and layer of metallic reflective material 21 on top of the black coating. Alternately, the black coating may be omitted and the reflective layer 21 may be bonded directly to the outside of rear pane 5. The reflective material 21 may be, for example, a thin layer of aluminum foil or other metal foil bonded directly to rear pane 5, or on top of black coating 19, or a thin coating of reflective metal which has been sprayed directly on the outside of rear pane 5 or on top of the black coating 19. An insulating material 23, such as Styrofoam, Fiberglass or any other heat insulating composition may be bonded to the outside of rear pane 5, most preferably on top of the metallic reflective coating. Panel 1 may also be provided with a cover 25 of transparent plastic which is desirably separated from panel 1 by an air space 26, which thus creates a "greenhouse effect."

The transparent panel through which the energy-absorbing liquid flows is preferably composed of an ultraviolet stabilized plastic, for example, ultraviolet light stabilized, acrylics and polycarbonates, but may also be composed of glass. The longitudinal side walls are not necessarily flat, nor is it essential that they form 90 degree angles with the front and rear panels. The purpose of the side walls is to provide a path for a circulating energy-absorbing liquid. Preferably, the channels are not larger than about 2 cm. in width and about 2 cm. in height, and more preferably, the channels are about 0.5 cm. to 1.5 cm. in width and about 0.5 to 1.5 cm. in height. A panel which is about 2 ft. × 4 ft. in size is convenient to use; however, panels of substantially larger size, i.e. about two or three times the just mentioned length and just mentioned width can be used if desired. The panes and side walls forming the panel may be as thin as the structural strength of the glass or plastic permits. Coated or laminated plastic compositions can also be used for the panel and the plastic cover may be the same or a different plastic from that used for the panels. While a flat cover for the panel has been illustrated, the cover can of course have any shape, such as a curved dome or the like.

Figure 3:
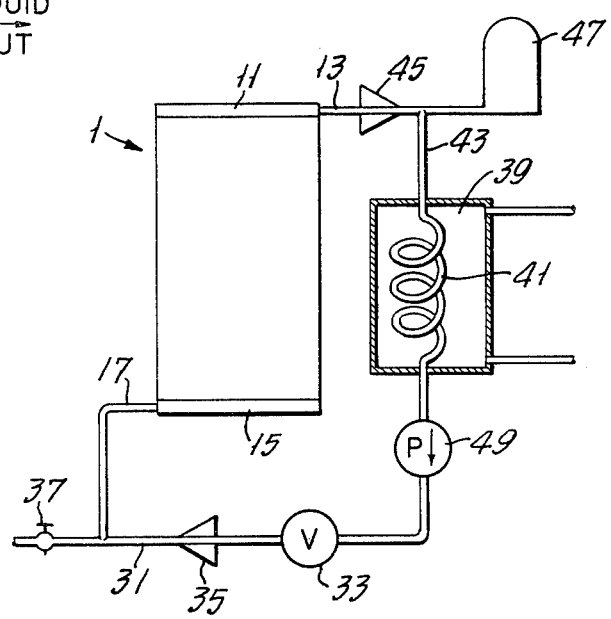
FIG. 3 is a flow diagram which illustrates a system and method of collecting and using energy from the sun in accordance with the invention.

A system for collecting and using energy from the sun in accordance with the invention, wherein a liquid dispersion of dark pigment, most preferably carbon, or a liquid solution of dark colorant is circulated in a transparent panel is illustrated in FIG. 3 and the process of the invention will be described with reference thereto. The energy-absorbing liquid is introduced to conduit 15 by means of inlet 17, so that it flows through the channels in panel 1, where it is heated by exposure to the sun. From the channels of panel 1, the heated energy-absorbing liquid flows into conduit 11, through outlet 13 and then into conduit 43, which is provided with a temperature measuring means 45, such as a thermostat and an expansion tank 47.

The heated energy-absorbing liquid then flows into the heat exchanger 39, by means of the coil 41, where heat absorbed by the energy-absorbing liquid is transferred to the medium of the heat exchanger 39, so that it is available for use. The energy-absorbing liquid then flows through conduit 31, which is provided with a temperature measuring means 35, such as a thermostat and a flow regulating means 33, such as a manually operated valve or a valve operated by thermostat. Conduit 31 is also provided with a valve 37, which may be used to fill the system with liquid or to empty the liquid from the system. From conduit 31, the energy-absorbing liquid is recycled back through inlet 17 and the channels of panel 1. Thus, the energy-absorbing liquid is circulated continuously, or if preferred, non-continuously in a closed loop, with the aid of a pump 49. The rate of flow may be controlled manually by the valve 33 or the valve 33 may be operated by the thermostats 35 and 45.

When a liquid dispersion of dark pigment is used as the energy collecting medium, it is preferable that the liquid be circulated in the system at a rate sufficient to provide some turbulence, so that substantially all of the pigment particles are maintained in a dispersed state. However, if a small proportion of the pigment particles precipitate from the liquid along the rear panel, no harm is done, since the dark and preferably black pigment acts in the same manner as the black coating on the rear panel to absorb energy from the sun.

The following examples further illustrate the best mode currently contemplated for carrying out the invention, but the examples must not be construed as limiting the invention in any manner whatsoever.

EXAMPLE 1

A liquid which absorbs 98% of energy from impinging rays of the sun is produced by combining with one liter of distilled water, 10 grams of AQUADAG, which is a composition of colloidal graphite containing 22% solids in water. The percent of energy from the sun absorbed by this composition per cm. thickness of liquid is determined by measurement with a pyrometer.

About 4 liters of this liquid-carbon dispersion is then circulated through the channels of a 4 ft. × 8 ft. panel of the type illustrated in FIGS. 1 and 2. The panel, which is constructed of TUFFAK-TWINWAL is 0.22 in. thick and contains about 80 channels per 2 ft. width. The channels of the panel vary from about 0.5 cm to 1.0 cm in thickness and are about 0.5 cm. in height. The outside of the rear pane is covered with a coat of dull black paint, a layer of thin aluminum foil is bonded to the rear pane on top of the black paint and then a layer of styrofoam is bonded to the rear pane on top of the aluminum foil.

The panel is placed so that at noon, the channels of the panel were perpendicular to solar rays. In April, in New Jersey, on a substantially clear day this system provides 780 watts per square meter to about 1045 watts per square meter, depending upon the time of the day.

EXAMPLE 2

An energy-absorbing liquid is prepared by mixing India Ink with deionized water, until the mixture absorbs 93% of the energy from the sun per cm. of thickness, as measured by a pyrometer. This liquid is introduced into the same system as in Example 1, and substantially the same results are obtained.

EXAMPLE 3

4,4'-Diamino-diphenylamine is dissolved in water until a 1 cm. thickness of mixture absorbs 92% of the energy from the sun as measured by a pyrometer. This liquid is introduced to the system described in Example 1, with substantially the same results as in Example 1.

EXAMPLE 4

Potassium permangate is dissolved in water until the resultant solution absorbs 90% of the light from the sun per cm. of thickness as measured by a pyrometer. This solution is circulated through a glass panel having a metallized reflective backing and a layer of Styrofoam insulation with substantially the same results as in Example 1.

When an energy-absorbing liquid which absorbs about 85–100% of energy from rays of the sun is introduced into a system, such as that illustrated in FIGS. 1 and 2, wherein the underside of the panel is covered with a layer of reflective material or is coated with both dull black paint and a layer of metallic reflective material and also has a layer of insulating material, substantially all of the energy reaching the liquid is absorbed thereby, due to the layers of black paint and/or reflective metallic layer and insulating layer. Moreover, the entire assembly is very light in weight and easy to install. The panel may be used as part of the basic roof structure; i.e., the present panels may be used in place of shingles or other outer roof covering.

I wish it to be understood that I do not desire to be limited to the exact details of construction shown and described, for obvious modifications will occur to a person skilled in the art.

What I desire to claim and protect by Letters Patent is:

1. A system for collecting energy from the sun comprising
    a transparent panel which absorbs substantially no energy from the sun composed of a plurality of channels open at both ends,
    a liquid flowing through said channels said liquid comprising a dispersion of dark pigment particles having a particle size of about 1 m$\mu$ to about 0.1 mm., in deionized water, wherein as a result of the particle size and amount of said pigment in said dispersion, the light absorbing characteristics of said liquid are such that said liquid, flowing through said channels absorbs about 85 to 100% of energy from impinging rays of the sun per centimeter thickness of the liquid,
    means for continuously introducing said liquid into one end of said channels and
    means for continuously removing said liquid from the other end of said channels.

2. A system according to system 1 which further comprises
    a heat exchanger through which said liquid flows after being removed from said channels,
    means for continuously transferring said liquid removed from said channels to said heat exchanger and
    means for continuously removing said liquid from said heat exchanger and for continuously transferring said liquid to said means for introducing said liquid into said channels.

3. A system according to claim 1 which further comprises
    conduit means opening to one end of each of said channels to introduce said liquid directly into each of said channels,
    conduit means opening to the other ends of said channels to remove said liquid directly from each of said channels,
    heat exchange means connected to both of said conduit means so that said channels, said conduit means, and said heat exchanger form a closed loop through which said liquid flows,
    means for measuring the temperature of the liquid in said conduits and
    means for adjusting the rate of flow of said liquid in dependence of the temperature of said liquid in said conduits.

4. A system according to claim 1 in which said channels are up to about 2 cm. in height and up to about 2 cm. in width.

5. A system according to claim 1 in which said panel is composed of transparent front and rear panes and a series of longitudinal walls which join said front and rear panes and form said channels and in which the outer surface of said rear pane is provided with a coating of metallic reflective material and wherein, when said panel is in use, said front pane faces the sun.

6. A system according to claim 1 in which said panel is composed of transparent front and rear panes and a series of longitudinal walls which join said panes and form said channels and in which the outer surface of said rear pane is provided with a layer of insulating material, wherein when said panel is in use, said front pane faces the sun.

7. A system according to claim 1 in which said liquid is comprised of a dispersion of carbon particles in deionized water and up to about 80% by weight of a nonionic antifreeze composition.

8. A system according to claim 1 in which said panel is composed of transparent front and rear panes and a series of longitudinal walls which join said panes and form channels which are up to about 2 cm. in height and about 2 cm. in width and in which said panel is made of ultraviolet stabilized plastic,
    said panel is provided with a metallic reflective coating on the outside of said rear pane, and
    said panel is provided with a layer of insulating material bonded to said rear pane on top of said metallic coating, wherein when said panel is in use, said front pane faces the sun.

9. A method for collecting and using energy from the sun which comprises continuously pumping a liquid comprising a dispersion of dark pigment particles having a particle size of about 1 m$\mu$ to about 0.1 mm. in deionized water or a solution of colorant, through a transparent panel which absorbs substantially no energy from the sun composed of a plurality of longitudinal channels opened at both ends, so that said liquid continuously flows through said channels in a series of streams, said panel being placed so that a transparent surface thereof and the liquid flowing therein are exposed to the rays of the sun, wherein due to the particle size and amount of pigment in said dispersion or the amount of colorant in said solution, the light absorbing characteristics of said liquid are such that said liquid flowing through said channels absorbs about 85 to 100% of the energy from impinging rays of the sun per centimeter thickness of the liquid, continuously removing each stream of said liquid directly from said channels, continuously circulating said liquid removed from said channels through a heat exchanger, continuously recycling said liquid from said heat exchanger through said panel, so that said liquid is circulated in a closed loop, monitoring the temperature of the liquid removed from said channels and the temperature of the liquid which has been circulated through said heat exchanger and regulating the rate of flow of said liquid in dependence of said temperatures.

10. A method according to claim 9 in which said liquid is comprised of a dispersion of carbon particles in deionized water containing up to about 80% by weight of a nonionic antifreeze composition.

11. A method according to claim 10 in which said liquid is circulated at a sufficient rate to maintain substantially all of the carbon particles in a dispersed state due to the turbulence resulting from the circulation.

12. A method according to claim 9 in which said channels have a width of about 0.5 cm. to about 2 cm. and a height of about 0.5 cm. to about 2 cm.

13. A system for collecting energy from the sun comprising a transparent panel which absorbs substantially no energy from the sun composed of substantially transparent front and rear panes and a series of longitudinal walls which join said panes and form a plurality of channels open at both ends, the outer surface of said rear pane being provided with a black coating and a metallic reflective layer on top of said black coating, when said panel is in use, said panel being placed so that said front pane faces the sun, a liquid flowing in said channels comprising a dispersion of dark pigment particles having a particle size of about 1 m$\mu$ to about 0.1 mm., in deionized water or a solution of dye, wherein as a result of the particle size and amount of said pigment in said dispersion or the amount of said dye in solution, the light absorbing characteristics of said liquid flowing through said channels are such that said liquid absorbs throughout its depth about 85 to 100% of energy from impinging rays of the sun per centimeter thickness of the liquid, means for continuously introducing said liquid into one end of said channels and means for continuously removing said liquid from the other end of said channels.

14. A system for collecting energy from the sun comprising a transparent panel which absorbs substantially no energy from the sun composed of a plurality of channels open at both ends, a liquid flowing through said channels comprising a dispersion of dark pigment particles having a particle size of about 1 m$\mu$ to about 0.1 mm. in deionized water or a solution of dye, wherein due to the particle size and amount of pigment in said dispersion or amount of dye in said solution, the light absorbing characteristics of said liquid flowing through said channels is such that said liquid absorbs about 85 to 100% of energy from impinging rays of the sun per centimeter thickness of the liquid, first conduit means opening to one end of each of said channels for introducing said liquid directly into said one end of each of said channels, a second conduit means opening to the other end of each of said channels into which said liquid flows from said channels, a heat exchanger through which said liquid flows and pumping means to effect the flow of said liquid to said first conduit, through said channels, into said second conduit and through said heat exchanger at a controlled rate.

15. A system according to claim 14 in which said liquid is an aqueous solution of a dark colorant selected from a member of a group consisting of an inorganic compound, an organic complex, or an organic dye containing up to 80% by weight of an antifreeze composition which is substantially inert with respect to the color characteristic of said colorant.

* * * * *